Nov. 13, 1962 M. PITRONE 3,064,113
ELECTRICALLY HEATED NURSING BOTTLE
Filed Jan. 5, 1960
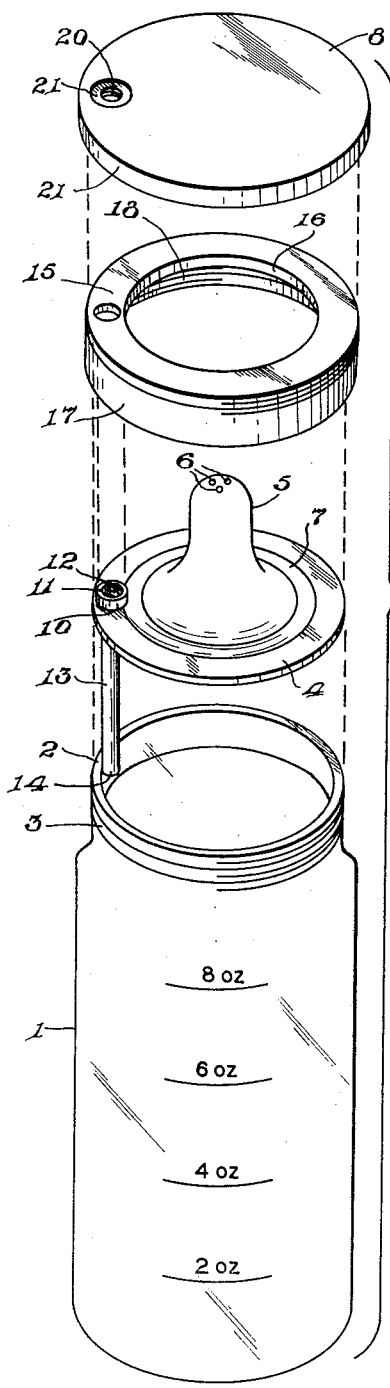
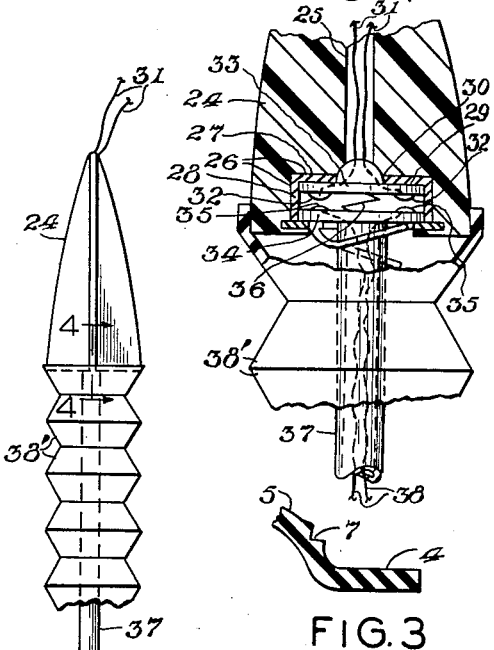
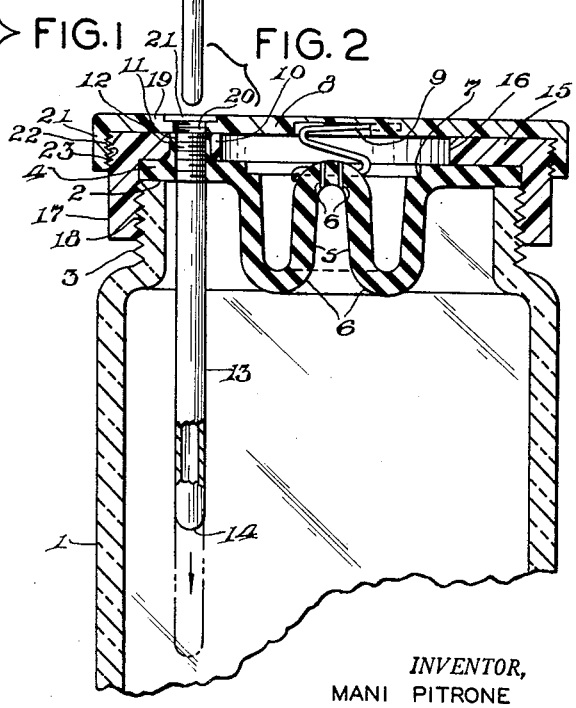
INVENTOR,
MANI PITRONE
BY J. Stuart Freeman
ATTORNEY United States Patent Office 3,064,113
Patented Nov. 13, 1962

3,064,113
ELECTRICALLY HEATED NURSING BOTTLE
Mani Pitrone, Box 272, New Hope, Pa.
Filed Jan. 5, 1960, Ser. No. 632
1 Claim. (Cl. 219—44)

The object of the invention is to provide improvements in containers designed to hold and dispense such substances as milk and other edible liquids, except when it is designed to keep them in their initial physical and chemical condition, this application being a continuation-in-part of Serial No. 706,978, filed January 3, 1958, now abandoned.

Also the invention relates to heating means, and it relates more particularly to means for heating the interior of a container, which may be of a standard type, such for instance as a can, jar, bottle, drum, tank, or the like, or it may be of virtually any type of container having a channel for the outward passage of the contents thereof.

When considering the present invention, it is to be understood that the same is in no way limited to any substances whatsoever, but instead is herein described with relation to milk as requiring probably as high a degree of purity and general edibility as any other substance, and is handled and used by a greater variety of persons than any other liquid.

Another object therefore is to provide a device of this class, that broadly comprises the combination of a container having a relatively large opening, a closure therefore comprising an annular member that has a large aperture, a distendable flexible breast-simulating element, and annular means to detachably secure the periphery of said element to said annular member.

A further object is to provide the combination of such a container and its closure with a removable cap adapted to be secured to said container across said closure, that when in operative position holds said closure in withdrawn position, and which when removed permits the expandable breast-simulating portion of said closure to yieldingly assume the normal and general position of the human breast, and which when thus released possesses that distendability and pliability that characterize the same.

Still another object is to provide the combination of the device above described with a non-inflammable tube having a closed inner end, and which extends through and is sealed to a peripheral portion of the closure, and into which can be temporarily inserted an electric heater element, by which the contents of the device can be readily heated, either while in closed condition, or after the breast-simulating element has been operatively extended.

With the objects thus briefly and broadly stated, the invention comprises further details of construction and operation, which are hereinafter fully described in the following specification, when read in conjunction with the accompanying drawings in which FIG. 1 is a perspective view showing the several parts of the normally assembled container as being separated in axial alignment; FIG. 2 is an enlarged fragmentary sectional view of the container showing its parts in fully assembled relation, with the detachable heater element removed therefrom in axial alignment with its normal position in axial alignment with the container's three-part closure; FIG. 3 is a fragmentary sectional view of the marginal portion of the breast-simulating element of the container closure, that is employed for the purpose of localizing angularly the annular fold in the breast portion, when it is reversely positioned inoperatively within the end of the container, as when the device as a whole is in storage or as when shipped from one place to another; and FIG. 4 is an enlarged fragmentary section showing the details of construction and relationship of those parts of the heater element along the 4—4 lines in FIG. 2.

Referring to the drawings, the embodiment of the invention here shown comprises any suitable form of jar container 1, that may be of any desired cross section and height that is found proper for a given commercial size, while the exterior margin of its slightly restricted upper open end 2 is provided with male threads 3, that in general suggest the structure of a so-called fruit jar in which preserved fruits are packed, shipped and sold, after having been prepared in any well known manner for storage, serving and eating. Upon the normal open end of this jar, referring to FIG. 1, there rests the plane marginal portion 4 of an annular distendable closure member, that is formed of rubber or other suitable elastic material, while centrally said member is provided with an extendable central portion 5, that simulates the nipple and adjacent surrounding portion of a natural breast, with one or more discharge apertures 6, that may be of very small size and constantly open, or may be yieldably closed in order to prevent the accidental discharge of the liquid that is within the container. In any case, such liquid is withdrawn from said container by the infant sucking the nipple, which otherwise is kept closed to prevent the accidental escape of liquid when such is not desired, as when the device is being shipped and/or stored and is subjected to the alternate expansion and contraction due to changes in temperature. When in normal use and the child releases its grip upon said nipple, air is automatically drawn into the container through said apertures 6, to replace the liquid that the child has withdrawn during its previous sucking action, and thereby maintaining a normal neutral air pressure within said container.

Referring more specifically to said nipple carrying portion, there is preferably provided at the junction between said nipple and the annular peripheral portion 4 of the device a suitable groove 7, that may in cross section be of any desired shape and depth but is of such nature that it tends to localize the position and shape of the bend of the nipple portion of the device, when it is pressed into the container as shown in FIG. 2 by the pressure of the final outer closure 8 pressing its centrally positioned light coil spring 9 upon it, as hereinafter described. The annular free marginal portion 4 is provided at any suitable point between its actual periphery and the radially outer side of said nipple portion with an integral raised extension 10, through which extends a circular bore 11 that is threaded in suitable manner, to receive the threaded upper free end portion 12 of a tube 13, that is closed at its innermost free end 14, and is preferably formed of such suitable material as a non-fragile plastic of which there are several obtainable. This tube extends any desired distance within said container, but essentially well into and beneath the normal upper level of whatever liquid is to be kept within said jar, and it will be readily appreciated that even with the outer end of said tube open its innermost end is closed permanently, that there can be no escape of liquid therefrom.

Said nipple-carrying element, when its marginal portion rests upon that flat edge of said container, is maintained in position by means of a suitable ring 15, that is plane and provided with a large central opening 16 of such relatively large size as to permit the nipple-bearing portion 5 of the closure to readily extend through it when its use is desired, while radially beyond said opening said ring is provided with a depending cylindrical flange 17, that has internal threads 18 for normal engagement with the similar threads 3 of said container, as shown in FIG. 2. Thus, when the device as an operative whole is intended to be used, the final closure 8 is removed, and the breast-simulating element 5 extends freely, as it is shown in FIG. 1, the device as a whole is available for use as said breast portion projects freely into operative position.

The nipple pressing spring 9 is positioned so as to depress said nipple from the freely extending position shown in FIG. 1 to the retracted position shown in FIG. 2. In the marginal portion 19 of said closure member there is also positioned a hole 20, that preferably has an enlarged entrance portion 21, while said hole itself may if desired be threaded, so as to permit the outer end of said container tube to be detachably secured in it. This last-mentioned member 8 is peripherally provided with an integral depending flange 21, that is inwardly provided with threads 22 for engagement with similar threads 23, carried by the uppermost outer surface of said nipple-pressing member 15, when added to the same to completely close the internal liquid, and thus protect it from all forms of dirt and foreign matter or particles, that may be present and liable otherwise to enter the container and contaminate such milk, or other contents.

The heating element shown in FIGS. 2 and 4 comprises a generally tapering head 24, formed of insulating material and provided with an axial bore 25, and with an enlarged recess 26 centrally disposed beneath the surface 27 of its normally lower end, into which the inner end of said bore leads. Within said recess there is securely positioned a generally cylindrical casing 28, the inner wall 29 of which has an aperture 30 for the entrance of a pair of insulated wires 31, that lead from a suitable source of current and at their inner ends are fixedly in engagement with a pair of diametrally arranged contact members 32, that are carried by a disc 33 of insulating material, which is fixedly positioned against the inner surface of said inner wall 29.

Movably positioned within said recess with respect to said fixed disc 33 is a second disc 34, that carries a second pair of contact members 35 in alignment with said first-mentioned contact members, and normally spaced from them by a suitable spring 36, but which permits said contact members to be moved into direct engagement, when and as said second disc 34 is forced inwardly by pressure applied longitudinally upon the hollow insulating yet heat-conducting rod 37, as it is forced into its inner limit within the tubular rod 13 within said container. Extending through said tubular rod are the wires of a flattened heater loop 38, whose ends are secured to said second pair of contacts 35, so that as said depending rod is forced inwardly the electric current heats said loop and the tube that encloses it, and consequently the milk or other liquid contents of the bottle.

If desired, there is also provided an extendable corrugated sleeve 38, that is secured at its upper end to the periphery of the conical head 24, while its opposite end portion is normally free to yieldingly extend along the rod 37, to protect the hands of persons while using it and to recede into a retracted position by which the rod that it normally shields is exposed, as its free end is inserted into the tube 13 within said container. In the use of this heater rod it is normally unheated, but quickly rises in temperature as it is forced into its innermost limit within the container tube, and remains so as long as said heater element is kept in the innermost position, or otherwise by means of a manually controlled or automatic timer. However, it is to be understood that the construction of this heater does not in any way affect the function and operation of the improved container as such, nor the operation of the breast-simulating element thereof and the nipple carried thereby.

Furthermore, a large number of liquid materials which require containers also require heating prior to use. In many instances such materials must be removed from their containers, so that they may be heated in a suitable vessel, and then removed from the vessel to another container from which they are ultimately dispensed. No only is the operation "messy" but heat is lost in the transfer from one vessel to another, and it is impossible to maintain a completely controlled heat. In other instances the original container itself may be heated by external means, in order to heat its contents; and the contents may then be dispensed from the container. This necessitates the container itself being heated to such an extent as to impart the desired heat to the contents; but in so doing the container must always be hotter than the interior and is often rendered too hot to be handled. Also, such means requires the expenditure of sufficient time and heat, first to heat the container and then to heat its contents. Furthermore, in both instances external heating means is required, occupying substantial space. The invention can also be applied to means for heating a baby food jar, a glue pot, a drum of roofing pitch which is shipped out to the job from the warehouse and is heated on the way so as to avoid waste of man hours on the job, a plumber's pot of lead which is similarly heated on the way to a job, to save man hours, or to any of a number of conceivable applications of the invention.

Having thus described my invention, what I claim and desire to protect by Letters Patent of the United States is:

The combination of a container having an aperture, a flexible closure for said aperture comprising a detachable breast-simulating element having a central portion surrounded by a fixed marginal portion, a relatively rigid retaining member having a central opening of greater diameter than the breast-simulating central portion of said closure, and normally having its marginal portion detachably secured to the marginal portion of said breast-simulating element and to said container, a relatively plain rigid cover secured to said retaining member about said opening, and at its center engaging and depressing the central portion of said breast-simulating element through the opening through which said breast-simulating portion automatically projects when released by said cover, an aperture in the marginal portion of said breast-simulating element, a tube having a closed inner end extending through said aperture into said container, a removable heater element insertable into said tube, an enlarged terminal head for said heater element, and an extendable sleeve surrounding said heater element, fixedly secured at one end to said head and contractable against said head as said heater element enters said container.

References Cited in the file of this patent

UNITED STATES PATENTS

| | | |
|---|---|---|
| 1,174,179 | Rickards | Mar. 7, 1916 |
| 1,251,411 | O'Connor | Dec. 25, 1917 |
| 2,471,172 | Stroller | May 24, 1949 |
| 2,628,909 | Horan | Feb. 17, 1953 |
| 2,628,910 | Horan | Feb. 17, 1953 |
| 2,648,226 | Finch | Aug. 11, 1953 |
| 2,887,239 | Reed et al. | May 19, 1959 |

FOREIGN PATENTS

| | | |
|---|---|---|
| 967,458 | France | Mar. 29, 1950 |